United States Patent
Kendall et al.

(10) Patent No.: US 6,973,652 B1
(45) Date of Patent: Dec. 6, 2005

(54) SEQUENCING OF TASKS WITHIN CUSTOMER SERVICE PROCESSING SYSTEMS

(75) Inventors: Guy Nigel Kendall, Christchurch (NZ); David James Plumpton, Auckland (NZ); Keith Victor Smith, Wellington (NZ); Ivar de Jong, Auckland (NZ); John Burns, Auckland (NZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,133

(22) Filed: May 15, 2000

(30) Foreign Application Priority Data

| Dec. 6, 1999 | (JP) | ................................ 11-346974 |
| Dec. 7, 1999 | (JP) | ................................ 11-347029 |

(51) Int. Cl.[7] .......................... G06F 9/46; G06F 17/00; G06F 12/00
(52) U.S. Cl. ...................... 718/100; 705/500; 710/200
(58) Field of Search ....................... 707/8–9; 705/500; 718/100, 102, 104, 106–107; 717/101–104; 710/200

(56) References Cited

U.S. PATENT DOCUMENTS

| 5,377,352 A | * | 12/1994 | Tanaka et al. ............... 718/103 |
| 5,937,409 A | * | 8/1999 | Wetherbee .............. 707/103 R |
| 6,324,678 B1 | * | 11/2001 | Dangelo et al. .............. 716/18 |
| 6,381,640 B1 | * | 4/2002 | Beck et al. .................. 709/223 |
| 6,519,763 B1 | * | 2/2003 | Kaufer et al. ................ 717/101 |

FOREIGN PATENT DOCUMENTS

| JP | 6-250844 | 9/1994 |
| JP | 2001-501752 | 2/2001 |

OTHER PUBLICATIONS

Japanese Office Action dated Jan. 22, 2004 with English translation of pertinent portions.

* cited by examiner

*Primary Examiner*—Meng-Al T. An
*Assistant Examiner*—Syed J Ali
(74) *Attorney, Agent, or Firm*—Whitham, Curtis & Christofferson, P.C.; Stephen C. Kaufman

(57) ABSTRACT

Methods and apparatus for executing a series of sequential tasks existing within a system-level domain of a customer computing system providing provisioning of meta-level domain products are disclosed. For each product or product action (202), one or more sequence of tasks (250–272) is defined. Within each sequence, one or more tasks are defined as milestones (250, 252, 254, 260, 264, 270, 272). The sequence of tasks is executed, and at each milestone task, an enquiry is made of a related meta-level domain feature to determine whether, as a precondition, it has attributes associating it with a customer, and further whether the product feature holds a locking attribute that corresponds with the milestone task. If so, the execution is continued, and the product feature is placed in a locked state such that its attributes cannot be changed until execution of the task sequence is complete.

3 Claims, 14 Drawing Sheets

SEQUENCING OF TASKS WITHIN CUSTOMER SERVICE PROCESSING SYSTEMS

RELATED APPLICATIONS

This application is related to commonly owned patent applications Ser. Nos. 09/571,678 and 09/569,221 filed on even date.

FIELD OF THE INVENTION

This invention relates to computing systems that are used for the provision of goods, services or information management. It relates particularly to sequencing of system-related tasks that provision business-related products.

BACKGROUND OF THE INVENTION

In modern large computing systems a common topology has three tiers: (i) a presentation tier characterised by multiple workstations focusing on user interactions, (ii) a business tier characterised by multiple servers executing application/business logic, (iii) a data tier characterised by multiple databases working on data storage and organization. A Local or Wide Area Network (LAN/WAN) interconnects the three tier elements.

Such computing systems find application in many and varied fields, ranging from university research and teaching facilities to business applications. In fact, almost every business will utilise such a system to transact its business functions and serve its clients. For example, a system may be used to control inventory, for word processing and accounts purposes, and for servicing client's enquiries. Many businesses have very large client bases and provide an extensive inventory of goods and services. One illustrative example is a telecommunications service provider (Telco) that serves a countrywide client base. The Telco's subscribers thus can number in the millions, and each customer will expect a near immediate response from a Customer Service Representative (CSR) to any inquiry, which can range from billing information, querying the status of an order, or the placing of orders for a product.

Similar examples are seen in Utilities, insurance companies, banks, hospitals, law firms, accountancy firms, stock exchanges, universities and Government agencies, to name but a few.

In all such computing systems there is an inherent tension between software and hardware resources. As customer demand, and the complexity of goods and services provided increases, it is economically inefficient and technically limited simply to attempt to increase the sizing of computing hardware.

Instead, there are significant gains in system performance that can be made by improving software coding, database management and system firmware architecture. All of these design elements are required to be considered if scalability is to be achieved. By 'scalability' is meant the ability of a three tier computing application (in terms of the number and type of information passed between workstations, servers and databases) to cope with growing volume of data, transactions and user base.

One approach to the problem of maintaining application program software is disclosed in published Japanese Patent Application No. 10-326190 (IBM Corporation), which utilises Object Oriented programs, and a control framework data base for regulating execution of various programs according to a classification regime.

"Provisioning" is the work actually required to be done to give effect to a business request. A provisioning action typically will involve a number of interrelated tasks that must be completed in a particular sequence. One approach to this requirement is described in published Japanese Patent Application No. 05-342227 (Tokyo Electric Co Ltd). This reference discloses an arrangement whereby individual actions are valid for a period of time defined by start and finish points. At best this is a limited approach.

The invention seeks to overcome or at least ameliorate problems in the prior art.

SUMMARY OF THE INVENTION

The invention provides a method for executing a series of sequential tasks existing within a system-level domain of a customer service computing system providing provisioning of meta-level domain products, each said product having features, and said features carrying an attribute prescribing a related locking milestone, the method comprising the steps of:

(a) designating one or more of said tasks as a milestone; and (b) executing said sequence of tasks, and for each said milestone task:

(i) making an enquiry of a related said product feature to determine whether the task milestone corresponds to said locking milestone and, if so, then (ii) continuing with said execution.

The invention further provides a method for provisioning goods and services in a customer service computing system, comprising the steps of:

(a) defining one or more sequential series of tasks in a system-level domain representing the provisioning required for any one of a plurality of product actions existing in a meta-level domain relating to said goods and services, each said product having features, and said features carrying an attribute prescribing a related locking milestone; and for each said sequence:

(b) designating one or more of said tasks as a milestone; and (c) executing said sequence of tasks, and for each said milestone task, (i) making an enquiry of said product feature to determine whether the task milestone corresponds to said locking milestone and, if so, then (ii) continuing with said execution.

The invention yet further provides a computing system for the provisioning of goods and services, comprising:

processor means operable define one or more sequential tasks in a system-level domain representing the provisioning required for any one of a plurality of product actions existing in a meta-level domain relating to said goods and services, each said product having features, and said features carrying an attribute prescribing a related locking milestone, and, for each sequence, to designate one or more of said tasks as a milestone, and execute said sequence of tasks such that for each said milestone task an enquiry is made of a said product feature to determine whether the task milestone corresponds to said locking milestone.

Advantageously, if the enquiry is true, then the product feature is placed in a locked state such that its attributes cannot be changed until execution of said task sequence is complete. There can be a precondition of determining whether a feature has attributes associating it with a customer, so as to be valid. The milestone tasks are reflected as aspects of said features in the meta-level domain.

BRIEF DESCRIPTION OF THE DRAWINGS

Embodiments of the invention will now be described with reference to the accompanying drawings, in which.

DETAILED DESCRIPTION OF EMBODIMENTS AND BEST MODE

Figure 1:
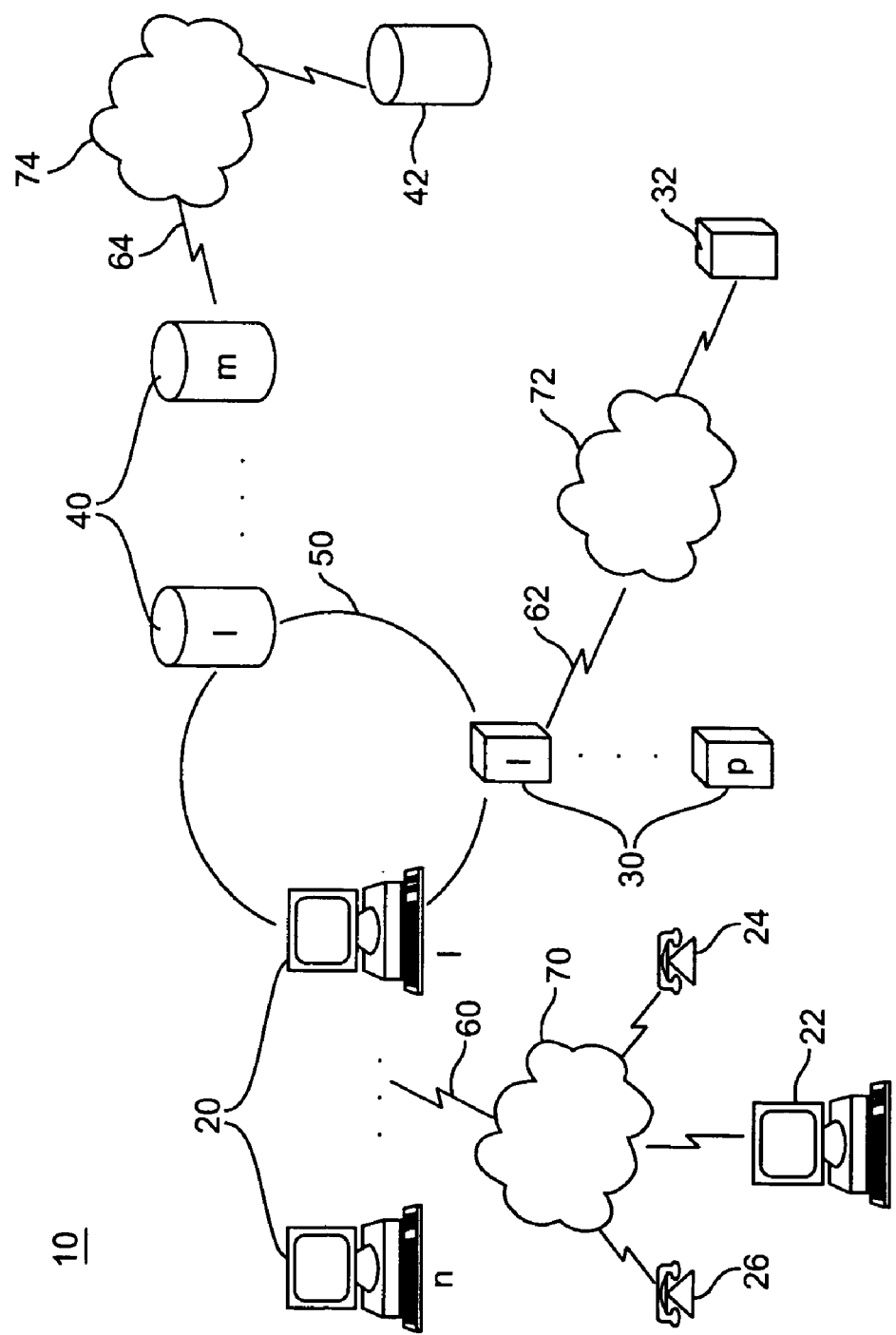
FIG. 1 is a representative topology of a three tier computing system embodying the invention.

FIG. 1 is a representative topology of a three tier computing system 10 embodying the invention. The presentation (or client/user) tier is represented by a number (1 ... n) of workstations 20, that can be appropriate computing terminals, for example personal computers. The business tier is represented by a number (1 ... p) of servers 30, that can be dedicated mini or mainframe computers. The data tier is represented by a number (1 ... m) of databases 40, which can include dynamically managed magnetic or optical storage media.

The computing system 10 is of an 'open' design, providing communication links 60, 62, 64, via external networks 70, 72, 74 to like-devices 22, 32, 42 and remote telephone terminals 24, 26.

The workstations 20, servers 30, and databases 40 are interconnected by a Local or Wide Area Network (LAN or WAN) 50. The LAN/WAN 50 carries information passing between each of the three basic elements described. It will be appreciated that the topology shown in FIG. 1 is representative only, and that any other convenient form of network could be implemented such that the objective of information passing between the workstations 20, servers 30 and databases 40 is achieved.

Embodiments of the invention find industrial application in the fields noted in the foregoing Background section. For the purposes of a non-limiting illustration, consider the example of a Telco operating across many States of the United States. Such a Telco will typically support local, regional, interstate and international voice and data calls, as well as cellular mobile voice and data traffic. Customers of the Telco can choose from a wide range of goods and services including, for example, the installation of second phone/fax/Internet lines, call forwarding, and messaging. They also will expect to be able to make enquiries of CSRs stationed at the workstations 20 concerning billing and service faults. It is not unreasonable to expect a modern-day Telco to have at least 1 million customers, typically requiring at least 500 CSRs. A Telco system infrastructure of this size can expect to handle about 15,000 business transactions per hour. For each business transaction there may be 6 CSR machine transactions required, and each individual machine transaction can involve up to 20 database transactions (i.e. I/Os).

To give a better example of the size of computing hardware required to achieve such performance, it is considered that the CSR workstations 20 should be Pentium™ personal computers running the Windows NT™ operating system, the servers 30 can be one or more IBM UNIX™-based 12-way RS6000™ S-70 machines, and the databases would require a capacity of about 40 Gbytes, managed by an Oracle™ or IBM DB-2™ system. There would, of course, be other operational LAN/WAN servers to handle data communications, as would be readily understood by a person skilled in the art.

In business systems such as a Telco, customers call CSRs and request goods or services in everyday language, such as a request for 'call waiting' to be activated on a domestic telephone line. Indeed, the CSR also operates at this level and is presented with information (as a GUI) on the display of the workstation relating to such goods and services. The computing system 10 then acts on customers' ordered goods or services, or enquiries.

One of the objectives of the present invention is to achieve scalability. A system model that has been adopted to assist in achieving this objective is 'statelessness'. By this is meant that data is passed to the servers 30 and the databases 40 without any record of the requestor's previous relevant information being retained on the server 30. In other words, every system transaction is contained by itself without needing to be aware of the earlier system transactions that were executed within the server for any, or this user.

Another related aspect is the design choice of not constraining the workstations 20 to communicate only with one particular server 30. Rather, any information request from a workstation 20 can be directed to any one of the 'p' servers 30. Yet further, it is only the servers 30 that can have access to the 'm' databases 40.

Another design choice is the use of Object Oriented programming, which enables componentization. Object Oriented programing is characterized by reusability, low (software) maintenance, ease of understandability, and extensibility. As such, it enables a linking of associated behaviours as building blocks of process states.

Principles of Object Oriented programing are described in: "The Unified Modeling Language Reference Manual" by James Rumbaugh, Ivar Jacobsen and Grady Booch, published by Addison-Wesley, December 1998 (ISBN 0-201-30998-X).

Overview

The 'goods and services' supported by the system 10 are termed "Products". Products are meta data that exist within both the workstations 20 and the servers 30 of the computing system 10. Products are constituted by 'Actions' and 'Tag Along Actions'. Within each Action are 'Features' and 'Provisioning Tasks', each of which are made up of 'attributes'.

It is useful to introduce the idea of 'Definition Time' and 'Order Management Time' at this juncture. Definition Time relates to the definition of a new Product (or the amendment of an existing Product) to the point where it is available for association with a customer. Order Management Time is the occasion when the new Product is live and launched to be available to the CSRs at the workstations. At Order Management Time, objects are instantiated to populate defined Product Templates with 'real' data, that is acted upon by way of provisioning a Product Action or the making of a database enquiry.

Figure 2:
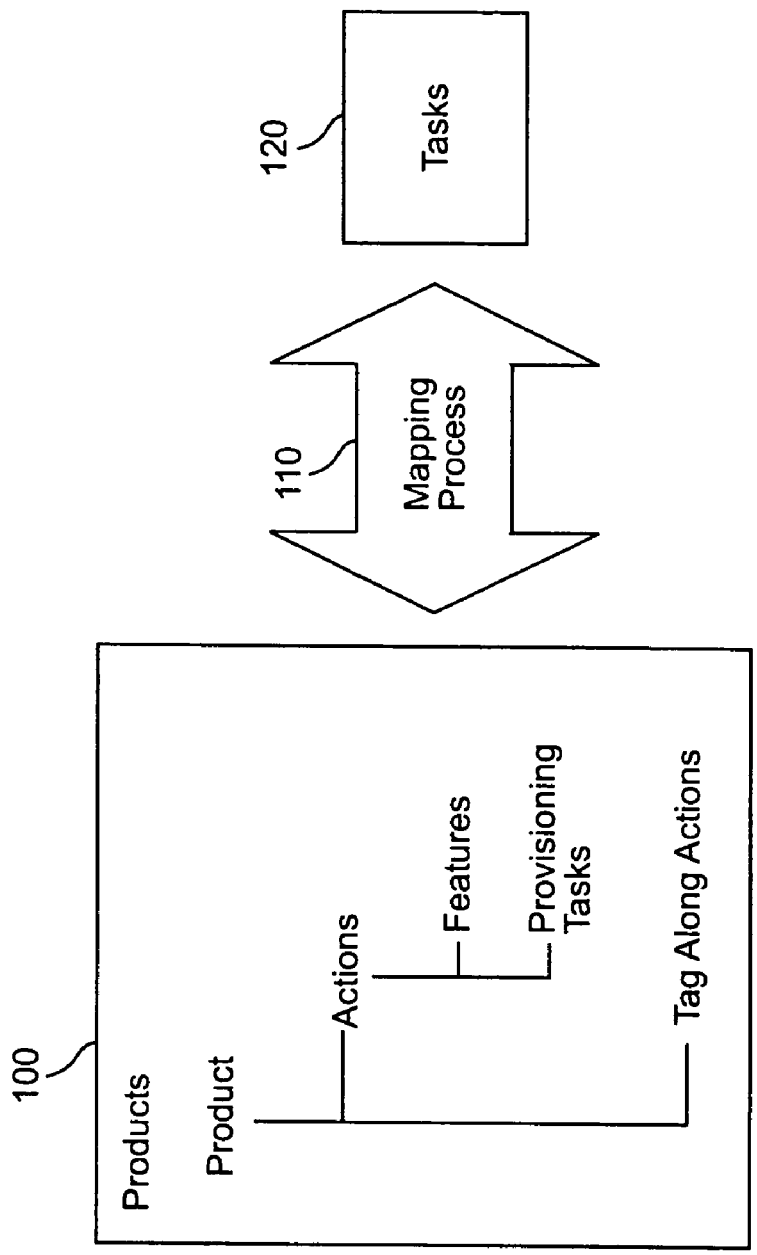
FIG. 2 illustrates meta state mapping between the Products and Tasks.

Products are defined during Definition Time to be available for a CSR to populate an instance in response to a customer order. As shown in FIG. 2, Products 100 are subjected to a mapping process 110 to become a series of tasks 120 which give effect to the Product. Tasks exist within the servers 30 and databases 40, and can return values to the Product Actions. The returned values update Product Action status information and constituent Feature attributes.

Figure 3:
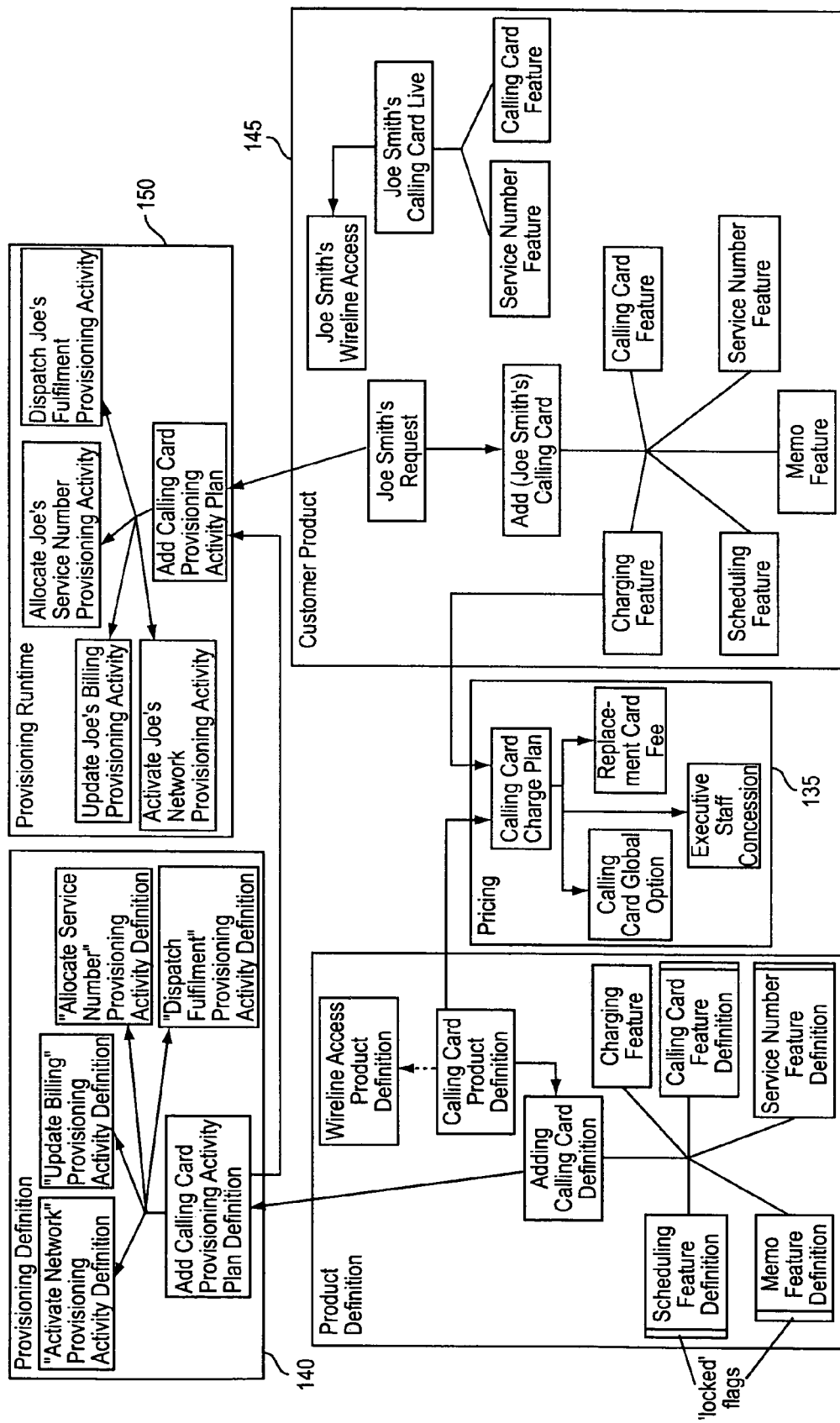
FIG. 3 illustrates subsystems that can be performed in the Product domain.

FIG. 3 shows interactions of the various 'process subsystems'. The subsystems "Product Definition" 130, "Pricing" 135, and "Provisioning Definition" 140 are created in Definition Time. The "Customer Product" 145 and "Provisioning Runtime" 150 subsystems arise only during Order Management Time.

The Product Definition subsystem 130 contains many meta data Products, and for the purposes of illustration, a "Calling Card" Product Definition is shown. 'Calling Card' has a (necessary) association at least with the Product "Wireline Access" (shown as a dashed line). It also has an "Adding Calling Card" Product Action Definition, with the constituent Features: "Scheduling", "Calling Card", "Memo", "Service Number", and "Charging".

The Pricing subsystem 135 has a Charge Plan definition with the associated Features: "Global Option", "Replacement fee", and "Executive Staff Concession".

The Provisioning Definition subsystem 140 similarly has a Provisioning Activity Plan for each Product Action (in this case only Calling Card is shown) with which are associated specific Tasks that relate to the actual work that is needed to be done to provision an Addition of Calling Card if requested. The Tasks are described as: "Activate Network", "Update Billing", "Allocate Service Number", and "Dispatch Fulfilment".

The Order Management Time is initiated with (in this case) Joe Smith's request for a calling card service, made to a CSR (in the Product subsystem 145). This results in the Add (Joe Smith's) Calling Card action occurring. The CSR questions Joe Smith about the specific Calling Card Feature requirements: "Calling Card", "Service Number", "Memo", "Scheduling", and "Charging". The Charging Feature also makes an enquiry of the stored Calling Card Charge Plan record, retrieving the appropriate information to become associated with the action.

The Request is then submitted to the Provisioning Runtime subsystem 150 for provisioning. A Provisioning Activity Plan is instantiated for the 'Add Calling Card' action, taking its format from the Provisioning Definition subsystem 140, populated with attributes collected in the Customer Product subsystem 145, as described above. A series of tasks are then performed: "Activate Joe's Network", and "Dispatch Joe's Fulfilment". Once these tasks have been performed, "Joe Smith's Calling Card" is live within the Customer Product subsystem 145, having associated with it a "Service Number Feature" and a "Calling Card Feature", and furthermore, being associated with Joe's pre-existing "Wireline Access Product".

Products

Products can be defined to suit a particular business or customer need. In that sense, an existing Product can be amended in some way, or a new Product can be added to a 'Product Book', which is a logical grouping of Products, such as those that can be sold to residential customers. In the Telco environment, Products might include:

Standard Wireline Access: The wireline connection into a home, allowing the home to have the physical product of a telephone.

Call Waiting: The ability to notify a customer that they have another call coming in to their phone line when they are on the phone.

Call Diversion: The ability to re-route telephone calls to another phone/mail box/pager, etc.

Standard Wireless Access: The connection to a cellular phone system.

Referring again to FIG. 2, Products 100 involve (a) Actions and, optionally, (b) Tag Along Actions. An Action can be "add" or "remove" a particular Product for a particular customer account/service, or change the configuration of the Product.

Actions are constituted by associated Features, such as, for example, the Location of Services (LOS), and Network Identifiers (NI). Features define the data instances to be collected. Actions also have associated Provisioning Activities, which relate to the necessary tasks (electronic and possibly also specifying human intervention) to give effect to the Action.

It should be noted that individual Actions can have relationships with one or more, or a group of other Product Actions. These relationships are captured by the 'Tag Along' Actions. They allow two Actions to be associated from a sales perspective, without explicit knowledge of the relationship from the CSR's point of view. For example, a Telco may wish to always associate a Maintenance Contract with a Wireline Access sale. In this case a Tag-Along relationship is created between the two Product Actions (i.e 'Add a Maintenance Contract' and 'Add a Wireline Access'), meaning that the CSR does not have to explicitly remember that when they sell a Wireline Access Product, they have to also sell a Maintenance Contract; rather it will be prompted.

The Mapping Process 110 for a Product (when populated with its attributes) to tasks involves the use of Task Mapper Keys. 'Attributes' are the units of data that are used to associate Products to tasks. The Task Mapper Key format is carried by the instantiated form of a Product Template.

Tasks

The task domain 120 operates at a lower level of abstraction, describing meta states. Tasks represent the work that needs to be completed to carry out a Product Action (whether as an enquiry or as provisioning of the Product). The tasks are ordered into a graph-like structure, that is called a 'Task Plan'.

In Object Oriented terms, an instance of a Task is an object. The definition of a Task is a class (i.e. the programed code). The data that makes one task instance different from another one is read from the database 40 when tasks are instantiated.

Within a Provisioning Activity Plan, certain Tasks act as Milestones. They can be envisaged as checkpoints to ensure the validity of data on the correct progression of the work flow. At these checkpoints messages are sent between the Product and Task domains to align themselves, and to decide if it is valid for continuation of the system process. An example of how these Milestones fit within, say, a Service Number Allocation (SNA) Activity, is that the Milestone after the 'Allocate Service Number' Task may have to ensure that the service number data element (a Product Feature) is valid. If it is not, then the system should not be able to proceed beyond that 'Allocate Service Number' activity Milestone. In this case, if the Service Number Feature is not valid, then the Milestone will fail and the provisioning will not be able to proceed. The rules as to when Product Features should be locked are defined during the Product Definition time. That is, for a given Product Action, a Product Feature will be locked at a given Milestone, preventing further updates by the CSR.

EXAMPLES

Product Definition

The first example of a new Product definition relates to a Telco providing customers with a new 'Standard Wireline Access' (SWA) Product.

Figure 4:
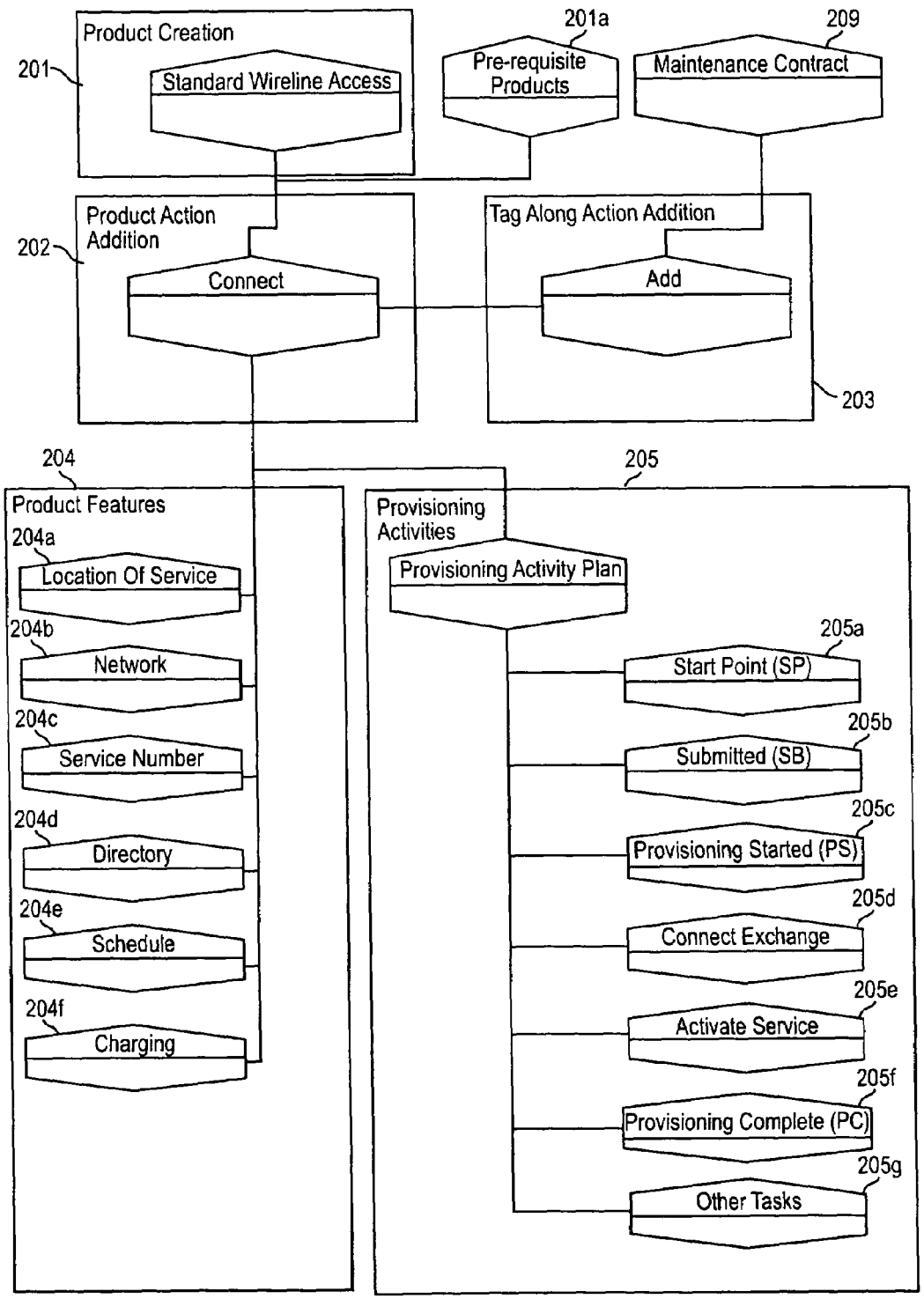
FIG. 4 is a flow diagram showing states relating to Product definition.

The following steps, defining this Product, should be read in conjunction with FIG. 4.

| | |
|---|---|
| Step 201 (mandatory): | Create a Product and call it "Standard Wireline Access". This creates a Product object with the name "Standard Wireline Access". |
| Step 201(a) (optional): | A "Prerequisite Product" allows the specification of another product that is a prerequisite for this product being added. For example, Call Diversion for Wireless Access cannot be defined without firstly having a Standard Wireline Access defined. |
| Step 202 (mandatory): | Create an action for "Standard Wireline Access", giving it the name "Connect" and defining its type be of the predefined Action Type "Add". This creates an Action object and associates it with "Standard Wireline Access" object. |
| Step 203 (optional): | Create the Tag Along relationship to the "Maintenance Contract" 209 Product's "Add" Action. This is achieved by: choosing the Maintenance Contract - Add Product Action from a list of previously created product actions. |
| Step 204 (Mandatory): | Create the Product Feature relationships and add to the "Connect" Product Action. |
| Step 204a: | Choose "Location Of Service" Feature from a predefined list of Features[1]. This creates a Location Of Service Feature definition, which is associated to the "Connect" Product Action. |
| Step 204b: | Choose "Network" Feature from a predefined list of Features. This creates a Network Feature definition, which is associated with the "Connect" Product Action. |
| Step 204c: | Choose "Service Number" Feature from a predefined list of Features. This creates a Service Number Feature Definition, which is associated to the "Connect" Product Action. |
| Step 204d: | Choose "Directory" Feature from a predefined list of Features. This creates a Directory Feature definition, which is associated with the "Connect" Product Action. |
| Step 204e: | Choose "Schedule" Feature from a predefined list of Features. This creates a Schedule Feature definition, which is associated with the "Connect" Product Action. |
| Step 204f: | Choose "Charging" Feature from a predefined list of Features. This creates a Charging Feature definition, which is associated with the "Connect" Product Action. |
| Step 205 (Mandatory): | Create the Provisioning Milestone Tasks/Milestones and add to the "Connect" Action[2]. |
| Step 205a: | Choose "Start Point" Milestone from a predefined list of Provisioning Tasks/Milestones. This creates a Start Point Milestone definition, which is associated to the "Connect" Product Action. |
| Step 205b: | Choose "Submitted" Milestone from a predefined list of Provisioning Tasks/Milestones. This creates a Submitted Milestone definition, which is associated to the "Connect" Product. |
| Step 205c | Choose "Provisioning Started" Milestone from a predefined list of provisioning Tasks/Milestones. This creates a Provisioning Started Milestone definition, which is associated with the "Connect" Product. |
| Step 205d: | Choose "Connect Exchange" Task from a predefined list of provisioning Task/Milestones. This creates a Connect Exchange Task definition, which is associated with the "Connect" Product. |
| Step 205e: | Choose "Activate Service" Milestone from a predefined list of provisioning Tasks/Milestones. This creates a Activate Service task definition, which is associated to the "Connect" Product. |
| Step 205f: | Choose "Provisioning Complete" Milestone from a predefined list of Provisioning Tasks/Milestones. This creates a Provisioning Complete Milestone definition, which is associated to the "Connect" Product. |
| Step 205g: | Select other provisioning tasks. |
| Step 206 (not shown): | Associate the "Standard Wireline Access" to the "Residential" Product Book. The Product is added to the Product Book for sale by a CSR. |
| Step 207 (not shown): | Test the Product. A series of tests are run to prove the consistency of the product structure. |
| Step 208 (not shown): | Launch the Product. "Standard Wireline Access" is now available for the CSR to view and sell. |

Note 1: This list is built up from a list of Product Features that has already been associated to the "Standard Wireline Access" Product and a list of Product Features that are specifically set up to be directly associated with the Product Action. One of the attributes of each Product Feature is a reference to a desired provisioning milestone (referring to one of the activities in step 205) at which the feature should be locked.

Note 2: This is a partial list of the total possible number of tasks to be provisioned, and represents typical milestones.

Figure 5:
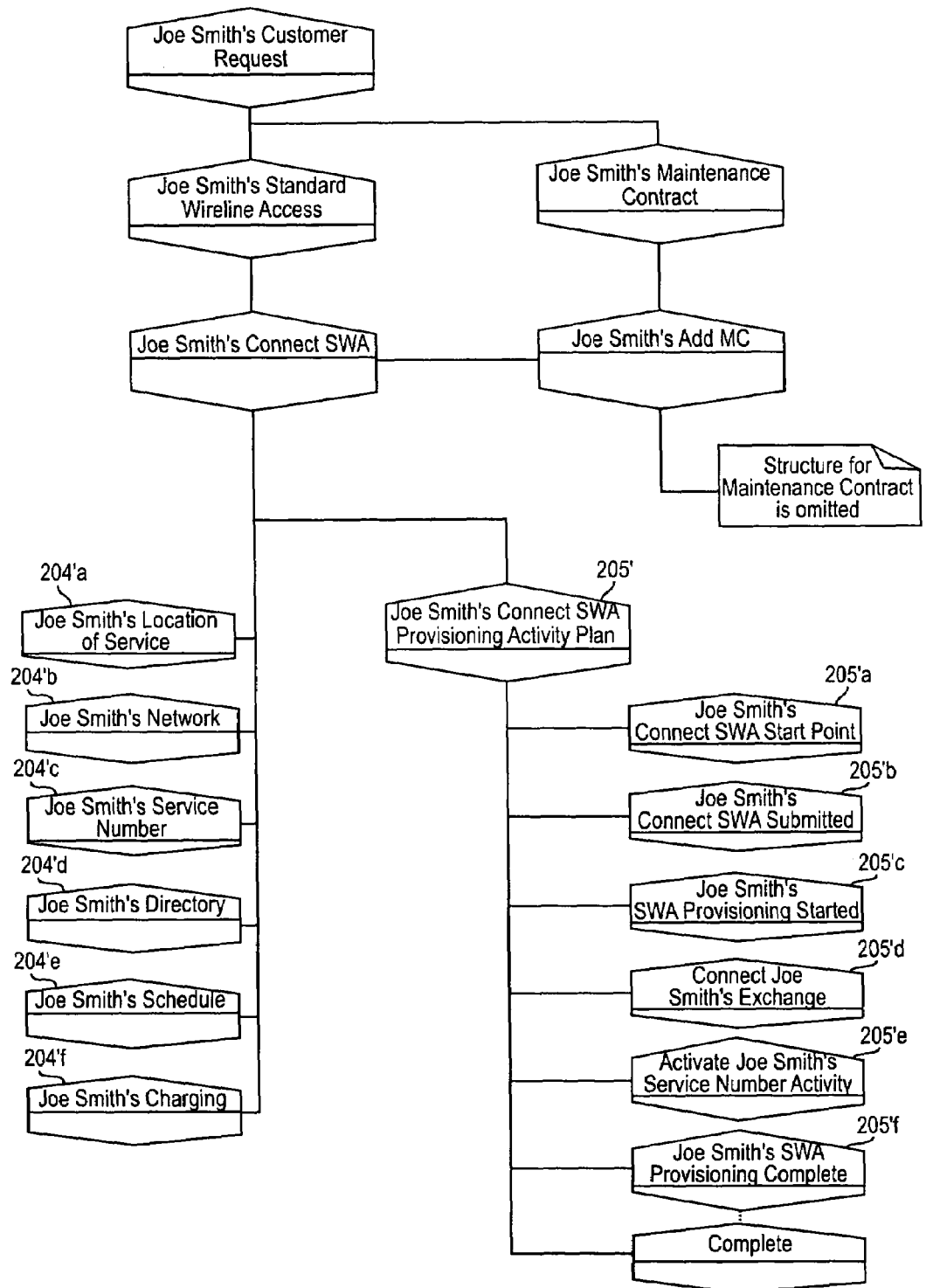
FIG. 5 is a diagram showing an instantiated Product.

FIG. 5 shows the instantiated form (i.e. at Order Management Time) of the Product Template of FIG. 4 of the SWA-C Product Action. The attributes for the instantiated LOS, N, SN, S and C Features are as follows:

| Attribute Name | Example | Description |
|---|---|---|
| Location of Service | | |
| Location ID (aka Location of Service ID) | 111 | A unique identifier |
| Street Name | Main Street | |
| Street Number | 505 | |
| Building Name | Voyager House | |
| Floor Description | Floor 2 | |
| Zip Code | ABS DEF | |
| Default Exchange ID | Yorktown Central | The Exchange that will be used to connect the Wireline Access through |
| Address Inhibited Flag | No | The address has no bad debt etc that would cause the address to be black listed by the Telco |
| Job Area | West Branch | The Work Area that will be used to complete the physical installation. |
| Network | | |
| Network ID | 111 | The "Network ID" identifies the Network Plant associated with the Customer Product. It is allocated by an external network System to uniquely identify a network circuit. |
| Class of Service Actual | Individual | This records the quality of service provided to the customer (e.g Individual, 2 party or multi-party line etc). |
| Exchange Work Required | Yes | This attribute indicates whether work is required to be done within the exchange to provide the service. |
| Outside Network Work Required | Yes | The value for this flag indicates if work is required to be done within the exchange to provide the service. |
| Switch ID | Switch 111 | The ID of the switch. The switch is the terminator for the telephone connection within the exchange. |

-continued

| Attribute Name | Example | Description |
| --- | --- | --- |
| Exchange ID | Yorktown Central | The ID of the exchange. The exchange is simply a building that houses switches. |
| Allocation Status | Successful | Defines the successfulness of the network circuit allocation. |
| Service Number | | |
| Service Number Directory | 1234 5678 | Joe Smith's Service Number |
| Listing Contact name | Joe Smith | The contact name for the directory listing people. |
| Listing Contact Number | 1234 5678 | Contact Phone number. |
| Listing Last Name | Smith | |
| Listing First Name | Joe | |
| Listing Title | Mr | |
| Listing Name Alternate Format | Mr J. Smith | |
| Listing Address Line 1 | Main | |
| Listing Address Line 3 | Yorktown Central | |
| Listing Extra Last Name | Smith | His Wife's Details |
| Listing Extra First Name | Sarah | His Wife's Details |
| Listing Extra Title | Mrs | His Wife's Details |
| Listing Extra Name Alternate Format | Mrs S. Smith | His Wife's Details |
| Directory Listing Confidentiality Type | Confidential | Depicts if the listing is "X-Directory", i.e. not published. |
| Scheduling | | |
| Commitment Strategy | By | Defines the commitment given to the customer, may be "No Commitment", "By", "Between Hours", "At" |
| Customer Required Date/Time | Jan. 1, 1999 1200 | Defines the date the customer wants the product or service. For the record only. |
| Actual Completion Date/Time | Jan. 1, 2000 1200 | The date/time the job was actually completed. |
| Negotiated Start Date/Time | Jan. 1, 2000 2400 | The date/time the CSR and the Customer negotiated that the job will be started by. |
| Negotiated End Date/Time | Jan. 1, 2000 2400 | The date/time the CSR and the Customer negotiated that the job will be completed by. |
| Schedule Priority | High | The priority of the schedule. |
| Schedule Valid to Date/Time | Dec. 31, 1998 | Defines the date until which the schedule is valid. After this date you will have to reschedule. |
| Access Instructions | The Key is under the doormat. | Define any information needed by the workmen undertaking the task, in this case connection. |
| Indicative Booking Reference | JSmith111 | A reference for the customer. |
| Charging | | |
| Payment Type | Account | Defines the type of payment, may be Cheque, Visa, account etc. |
| Account number to charge | Jsmith 123 | Joe Smith's account number. |
| Effective Date Time | Jan. 1, 2000 2400 | Date the charge is effective from. |
| Expiry Date Time | Jan. 1, 2001 2400 | Date the charge expires. |
| Charge Plan Definition ID | Cplan | The Charge Plan Joe Smith has chosen. |

The Provisioning Activity Plan for connecting Joe Smith's Standard Wireline Access is created when the request is submitted for provisioning.

Task Mapping

The mapping process 110 of an instantiated Product Action to a 'Task Plan' involves the use of a Task Mapper Key and an associated Task Template. In basic terms, the steps followed are:

1. A Task Mapper Key is built from amongst the attributes of the instantiated Product Template (e.g. FIG. 5).

2. For each constituent Provisioning Activity, the correct Task Template is located (from amongst a pre-stored and defined library).

3. A Task Plan is built up from the constituent Task Templates, and available for execution as a sequence of specific work tasks.

An example of the mapping process will now be given with reference to the object interaction diagram of FIG. 6.

Task Mapper Key

The Task Mapper Key is a particular subset of the attributes associated with a Product Action whose values will be used to identify the specific tasks that must do the work of provisioning.

The server process instructs building of the Task Mapper Key for the SWA-C Action (MapToTasks( )). Each Provisioning Activity 205' is considered in turn, except for those designated as Milestones.

For ease of explanation, consider only the 'Connect Exchange' Provisioning Activity 205d. For this Activity, the getTaskMapperKeyDefinition( ) command retrieves, from the definition form of Connect Exchange 205d, the string:

"Region&SwitchID&ExchangeID"

The command getActivityDefinitionID retrieves, from the definition form of Connect Exchange 205d, the string:

"value"

Next, the command getAttributeValue( ) is executed for each parameter (ie., Region, Switch ID and Exchange ID), obtained from the run-time version of 'Joe Smith's Location of Service'204'a, and 'Joe Smith's Network' 204'b.

In this example, the Activity Definition ID is: "123". The Task Mapper Key Definition is "Region&SwitchID&Other", where "&" is a separating operator. The Activity Definition ID is the value that substitutes for the "Connect Joe Smith's Exchange" Activity. The number of mandatory keys, held in the Activity Definition ID is, in this example, "2".

The Task Mapper Key is built to become: "Yorktown&Switch2&AAA".

Locate Task Template

A predefined list of Task Templates are maintained in the database 40, each of which represents a sequence of work tasks that constitute a part of the overall Task Plan.

The command SearchForRow(ActivityDefinitionID, TaskMapperKey) is executed, by which the Task Mapper Key is compared against the set of Task Templates.

The database is searched for the Activity Definition ID and the Task Mapper Key. Thus the search is for: 123, "Yorktown&Switch2&AAA". Consider the extracted database entries:

| | |
| --- | --- |
| 100 | Armonk&Switch2&BBB |
| 123 | Yorktown&Switch1 |
| 123 | Yorktown&Switch2&CCC |
| 123 | Armonk&Switch2 |
| 124 | WhitePlains&Switch4&DDD |

If there is a direct match, then the 'Task Template Located' state has been reached. For these entries, however the search produces a nil result. In such a case, the search would be restricted and the adjust Task Mapper Key ( ) command invoked. Since the number of mandatory keys is "2", the Task Mapper Key becomes: "Yorktown&Switch2", in which case the third row of the database entries listed above provides a match, and provides the Task Template.

If, once all the optional keys have been discarded, there still is no match between the reduced Task Mapper Key and the Task Templates, then the SearchForDefaultRow (ActivityDefinitionID) command is invoked, by which the default Task Template for Activity ID=123 is retrieved from the database 40.

At this juncture, the Task Template has been located.

Task Plan Formation

Each Task Template specifies a sequence of work tasks. For the example of Connect Joe Smith's Exchange activity, the Task Template is "Yorktown&Switch2", which corresponds to the task of: connectexchange.

For a modern telephone exchange it can be enough for a single task to be issued. In other, older exchanges there can be a set of tasks required such as: dispatchtechnician, disconnect, connectswitch2, and callback to mainexchange.

Figure 6:
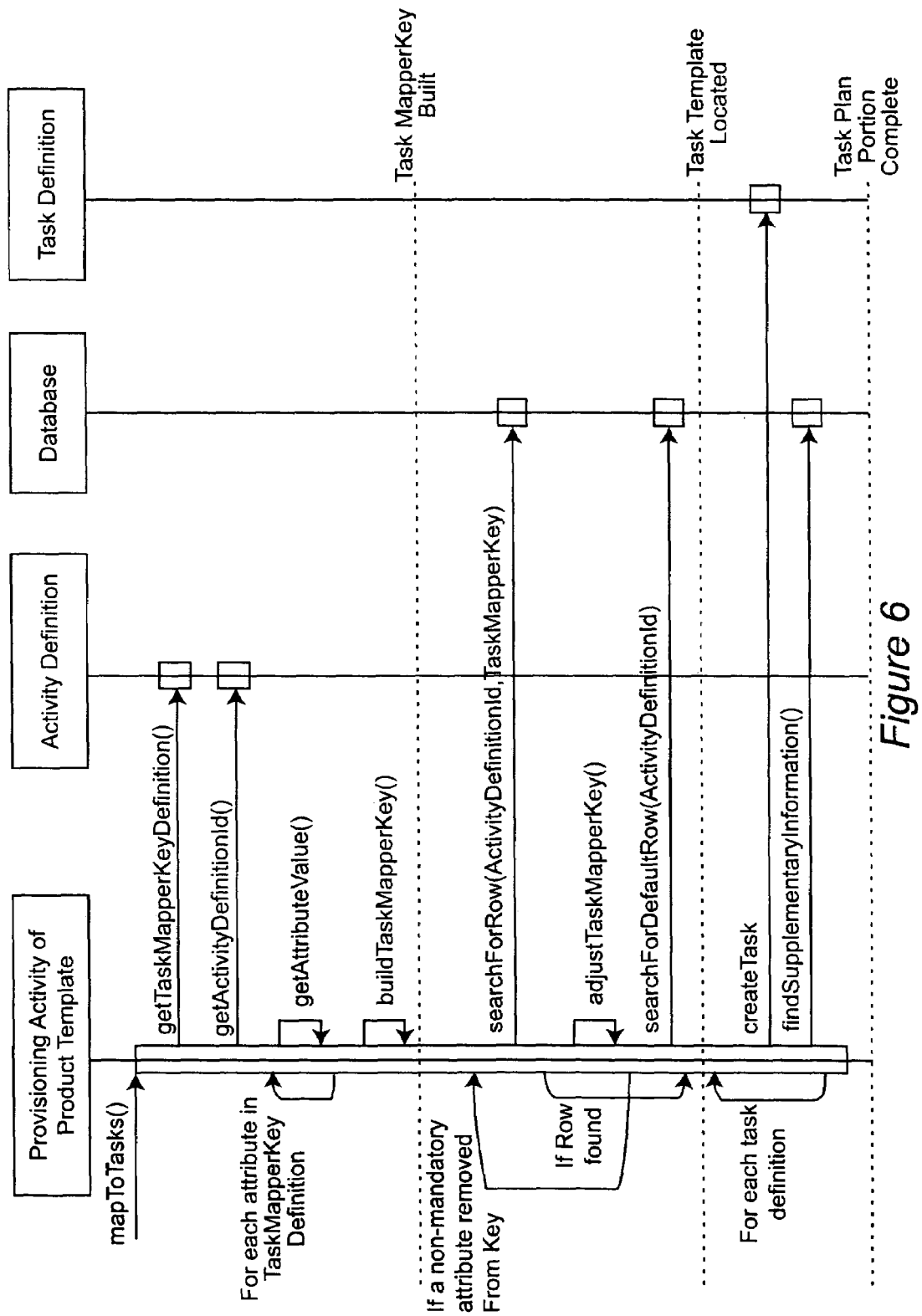
FIG. 6 is an object interaction diagram for the task mapping process.

The process described in FIG. 6 is repeated for the remaining Provisioning Activities of FIG. 5, and the completed Task Plan is built up as the sequence of elemental tasks.

So far as the supplementary information is concerned, this specifies who will perform the work defined by the tasks. A further search is made of another database table for this information, based on the Task Template. The 'work' could be performed automatically at a local exchange, or may require technicians to install physical wiring and supply a handset. If no such information is found, then default information is utilized.

Feature Attribute Locking

Now the Task Plan has been realised, it is executed/provisioned, which involves database accesses as well as discrete work actions. The provisioning includes the concept of 'attribute locking', which is related to Task Milestones.

To illustrate the application of attribute locking, consider again the example of Joe Smith requesting the Product Action 'Connect Joe Smith's Standard Wireline Access' from a CSR on a Monday. Joe has specified that his required connection date is to be the following Thursday. This is a constituent attribute of the Scheduling Feature 204e shown in FIG. 4. The Action is submitted for provisioning, and the Task Plan realised. One of the specific work tasks is for a technician at the Exchange to connect the appropriate circuit. If Joe calls the CSR on Thursday morning requesting that the connection date be delayed, then it is desirable for that Feature attribute to have been 'locked' such that it cannot be changed at such a late stage.

Figure 7:
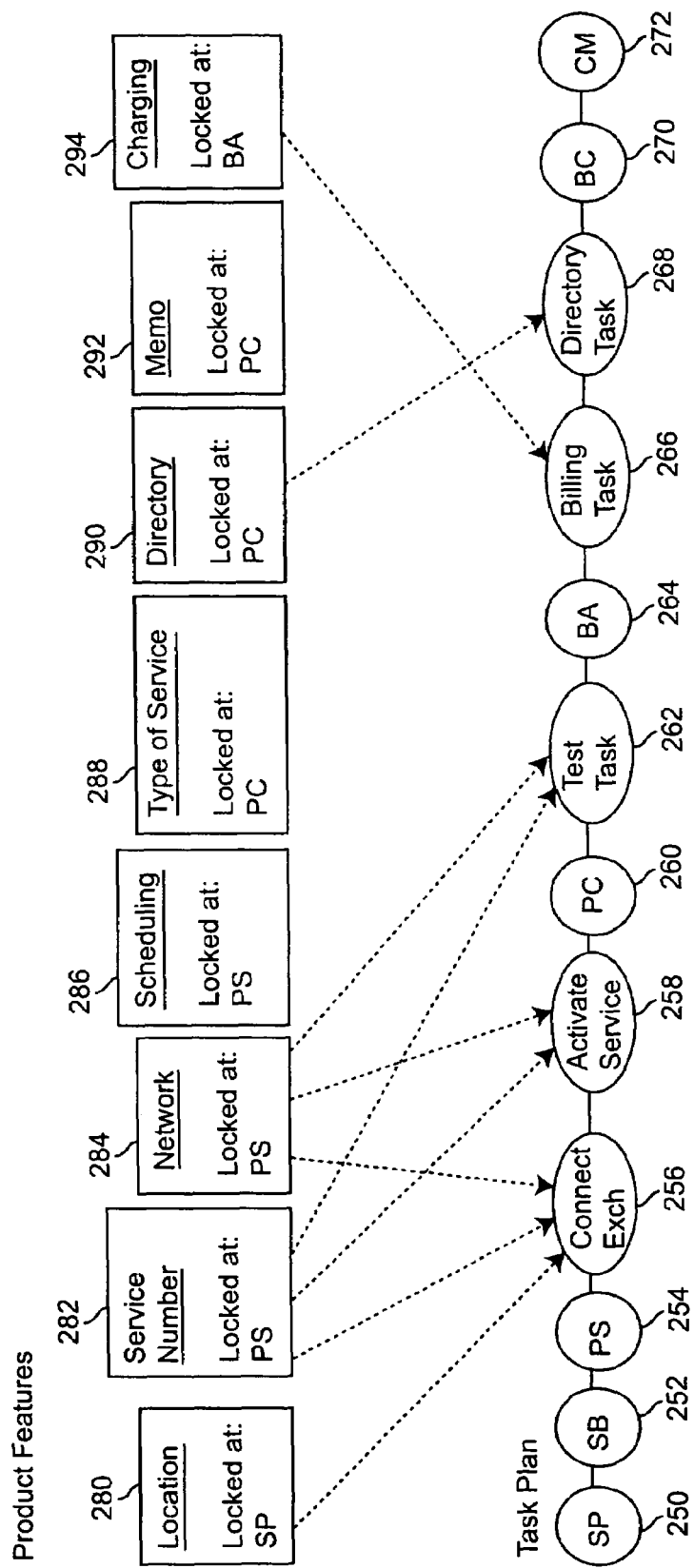
FIG. 7 is a diagram showing a task plan with attribute locking.

For the Product Action "Standard Wireline Access—Connect", the following table, to be read in conjunction with FIG. 7, which gives an example of the sequential tasks:

| ID | Provisioning Activity Name | Milestone (Y/N) | Prerequisite ID | Comment |
|---|---|---|---|---|
| 250 | 'SP' — Start Point | Y | — | |
| 252 | 'SB' — Submitted | Y | 250 | |
| 254 | 'PS' — Provisioning Started | Y | 252 | |
| 256 | Connect to the Exchange | N | 254 | |
| 258 | Activate Service | N | 256 | |
| 260 | 'PC' — Provisioning Completed | Y | 258 | |
| 262 | Test Network | N | 260 | Used only when 'Customer Work Required' flag is set to N |
| 264 | 'BA' — Available for Billing | Y | 262 | |
| 266 | Update Billing | N | 264 | |
| 268 | Provide Directory Task Information | N | 266 | Not used when Listing Type is 'Confidential' |
| 270 | 'BC' — Billing Completed | Y | 268 | |
| 272 | 'CM' — Completed | Y | 270 | |

The Task Plan of FIG. 7 is executed in a sequential manner until it reaches a milestone task. At this point an enquiry is made of the related Features of the Product Action to determine firstly if they are valid (i.e., associated with customer information). If it is not valid, then the Task Plan cannot proceed. If the particular milestone encountered is the one held by the Feature as signifying that locking should occur, then the 'Features locked status flag' is set to true (see also FIG. 3), and an acknowledgment returned to the milestone task so that provisioning can continue. When this flag is set, the consequence is that a Product Feature's attributes cannot then be changed—they are in the 'locked' state. If the task milestone does not correspond with the milestone held by the Feature, then the Task Plan can still continue, with the Feature remaining in an 'unlocked' state.

FIG. 7 shows (in addition to the Task Plan) the relevant Provisioning Activity milestone held by each Product Feature. For the SWA-C example of connection on Thursday, the milestone 'Provisioning Started' 254 is relevant. That is, if the PS milestone has passed then the Scheduling Feature will have its locked status flag set, and the 'customer required date' is not able to be changed.

Another aspect of the locking process is that a CSR can make an enquiry of the progress of provisioning tasks, such that a customer can be told that: "the exchange connection will happen today".

Product Definition and Order Management Interactions with Computing System

Figure 8:
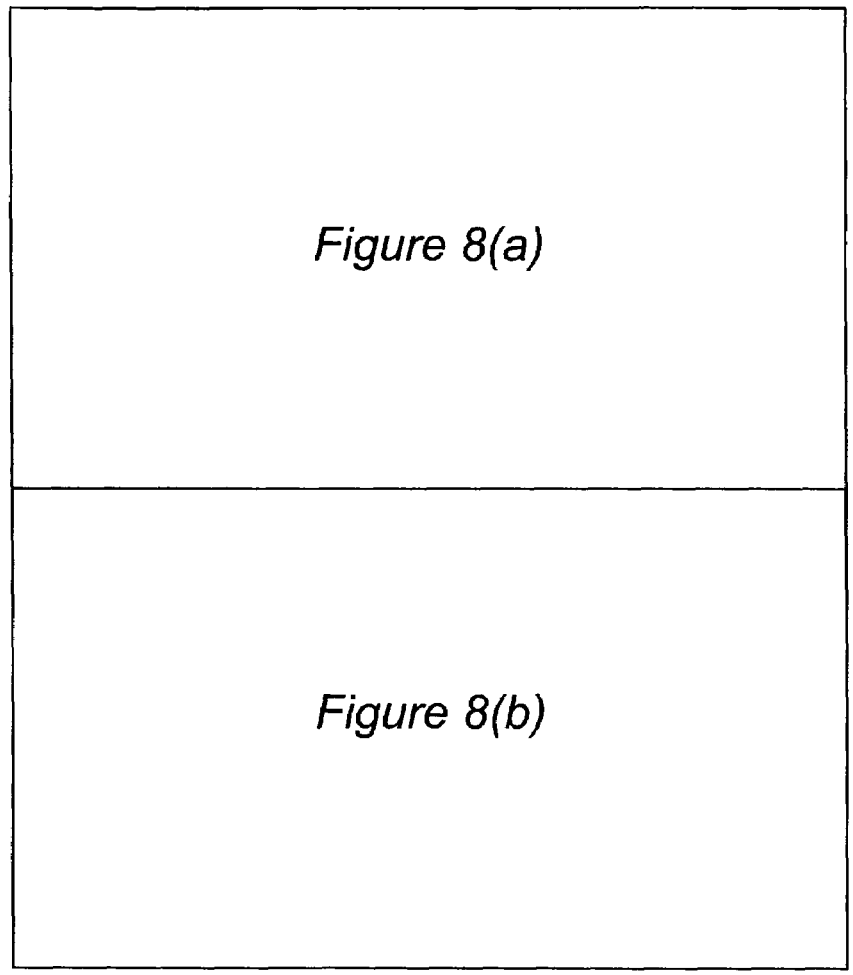
FIG. 8 is a flow diagram for a new Product definition with reference to the computing system elements.
Figure 8A:
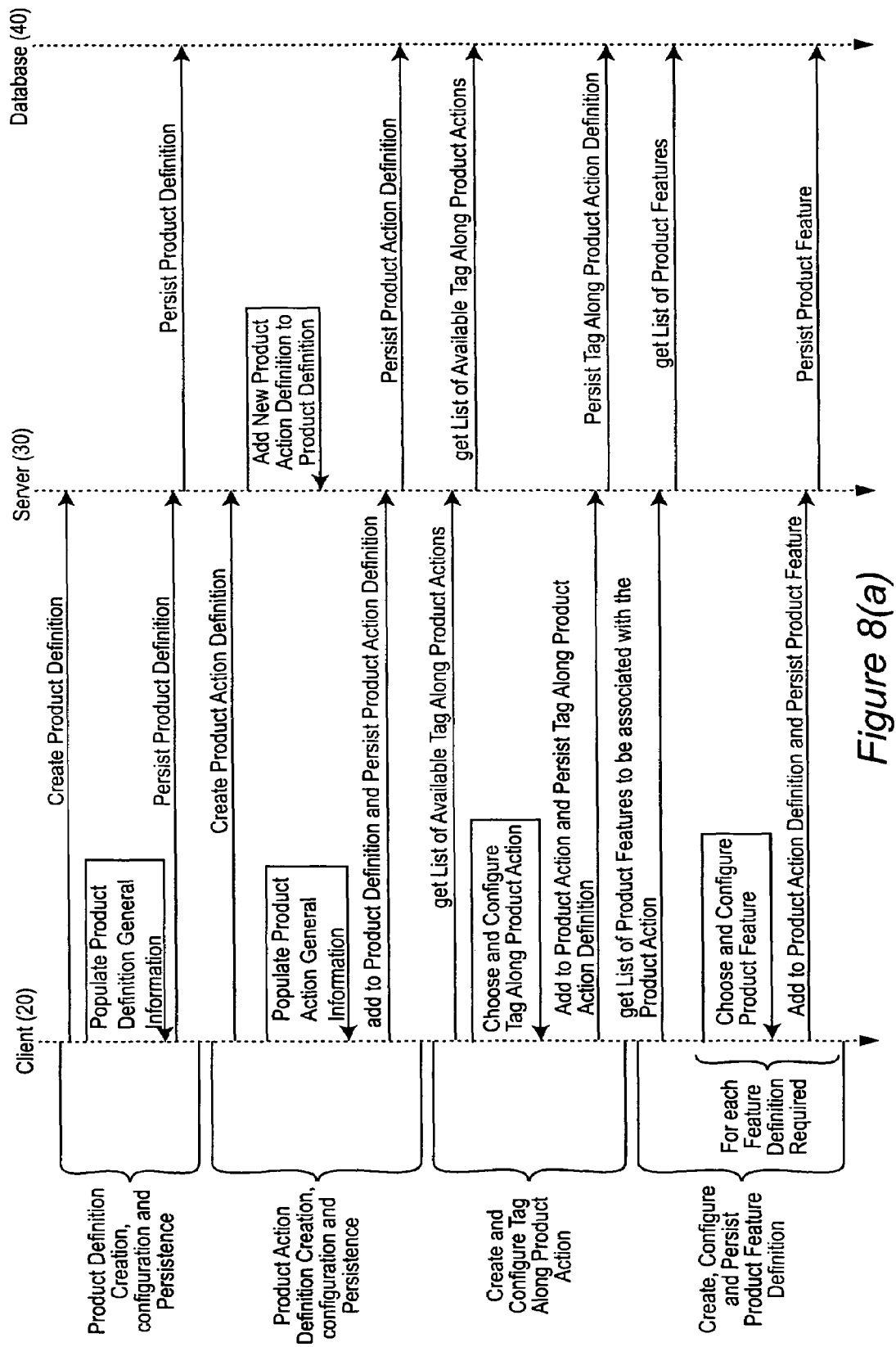
Figure 8B:
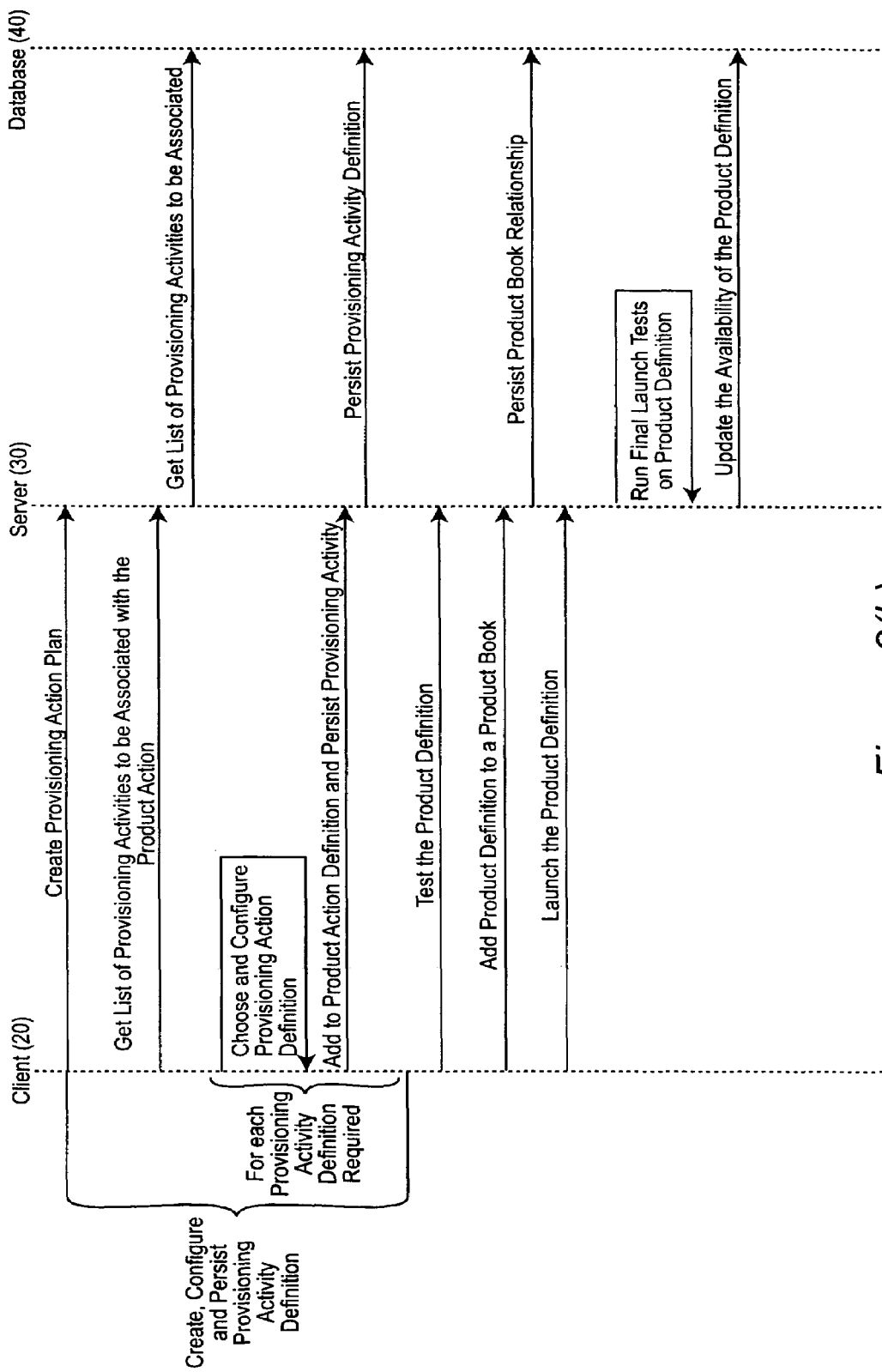

FIG. 8 is a self-explanatory flow diagram relating the Product Definition time activities, particularly as described above with reference to FIG. 3, with reference to the client workstations 20, servers 30, and databases 40.

Figure 9:
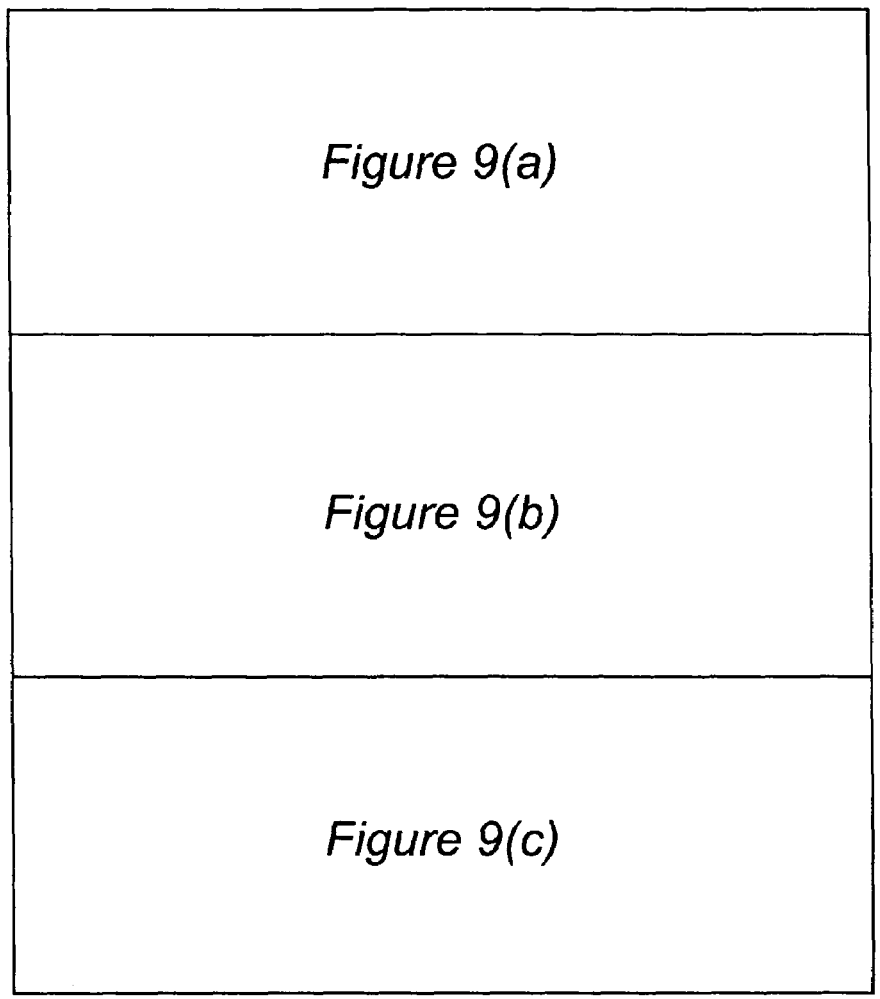
FIG. 9 is a flow diagram of Order Management Time with reference to the computing system elements.
Figure 9A:
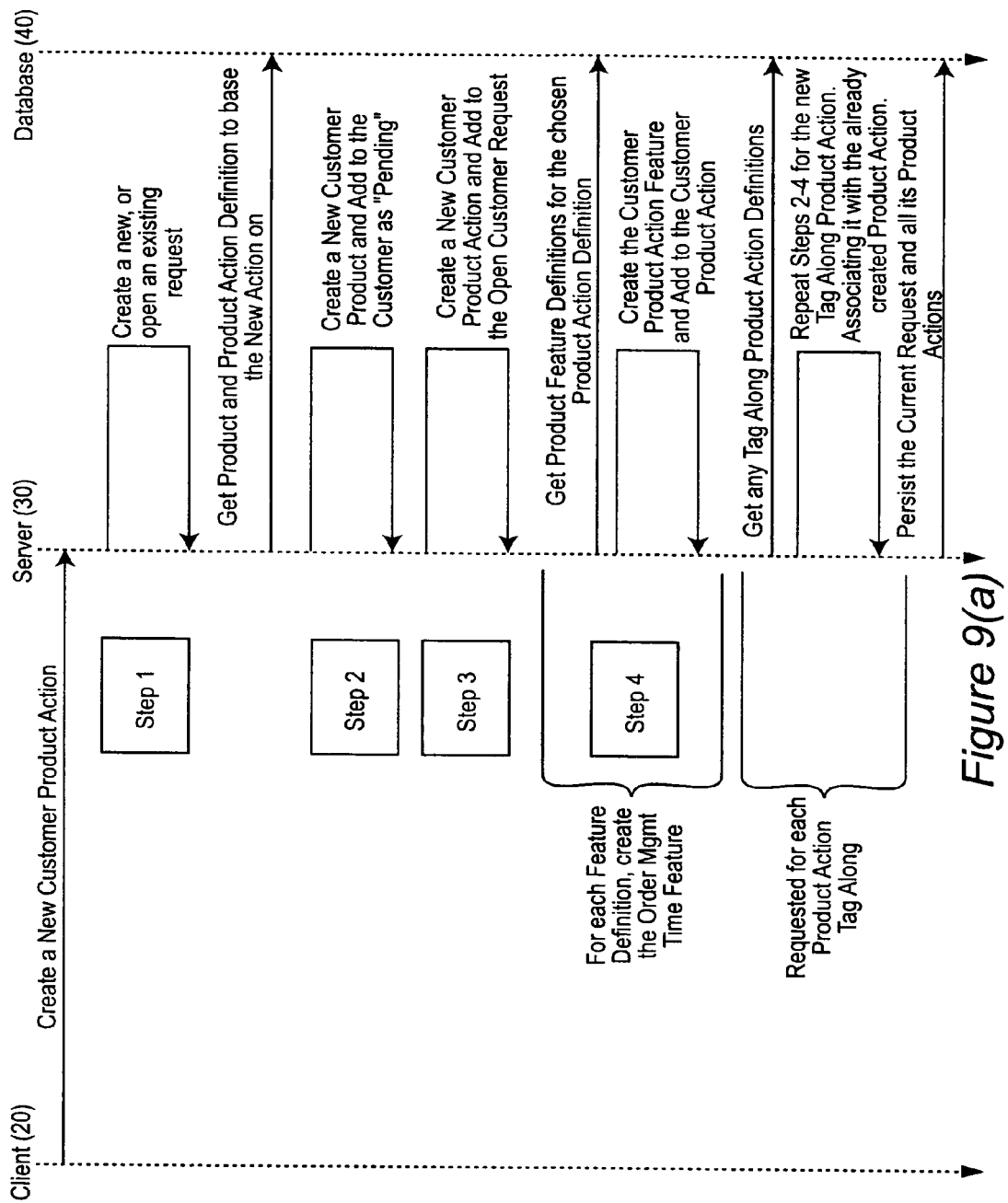
Figure 9B:
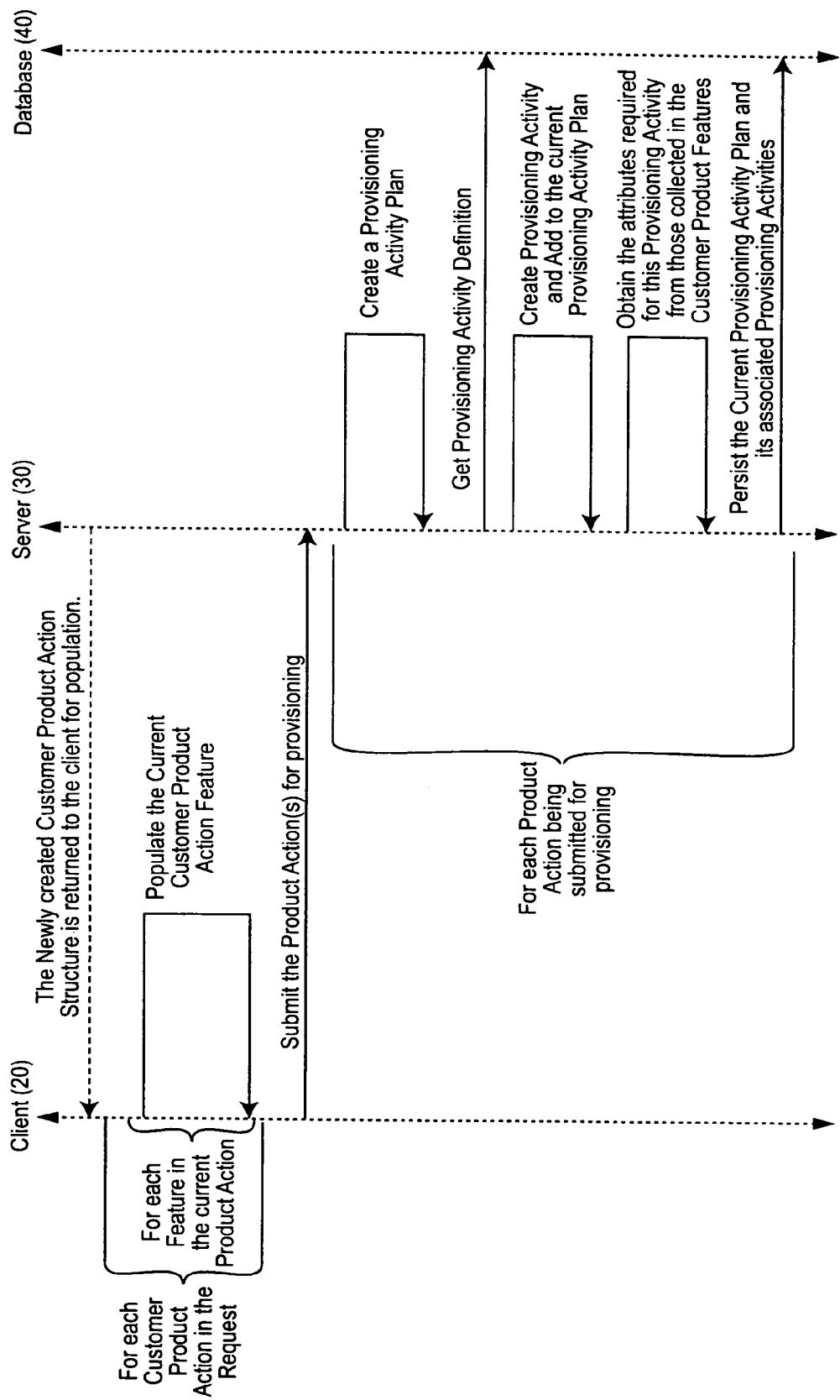
Figure 9C:
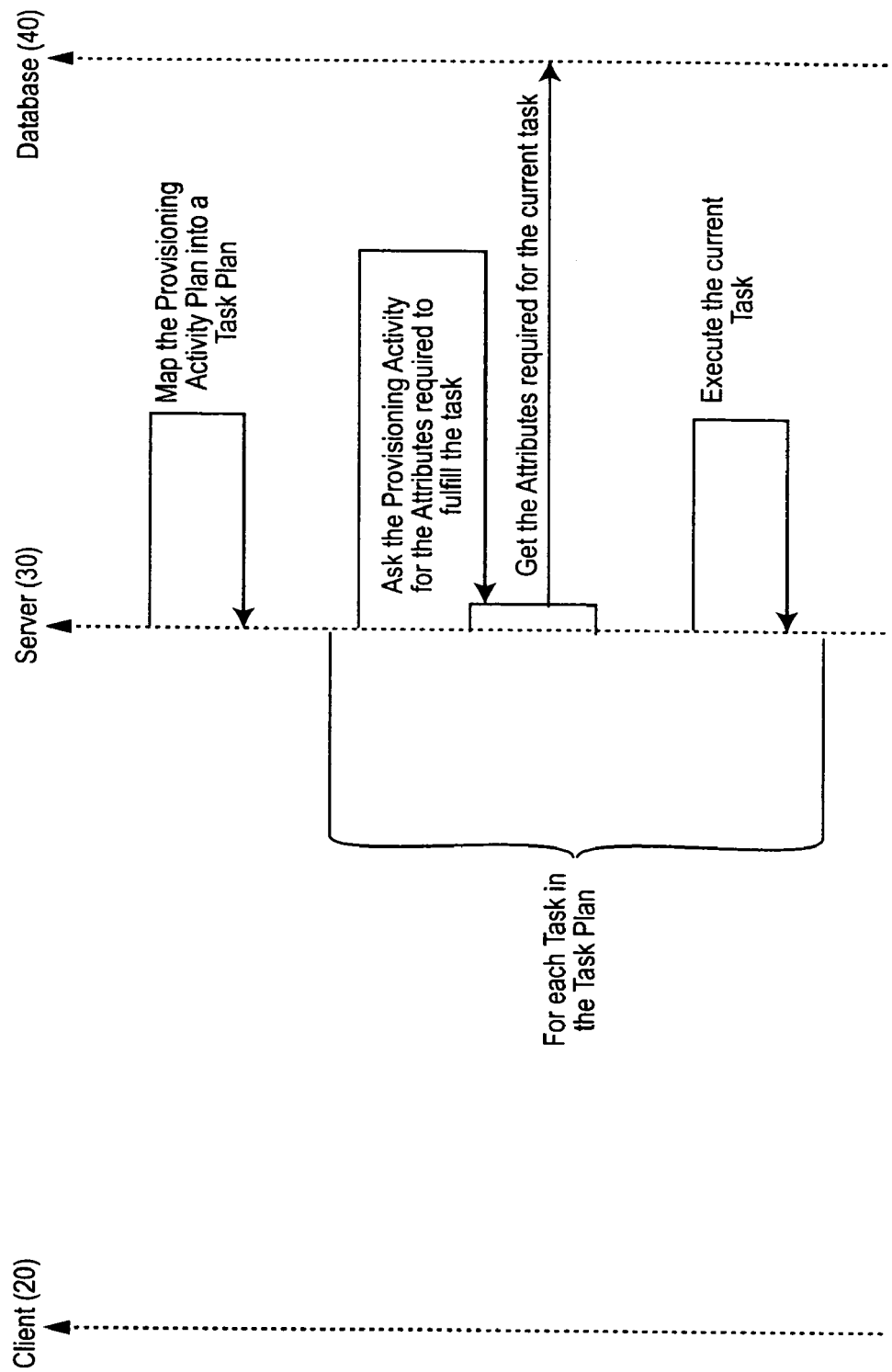

FIG. 9 is a similar, self-explanatory flow diagram relating the Order Management activities, particularly as described above with reference to FIGS. 4 to 7, with reference to the client workstations 20, servers 30, and databases 40.

ADVANTAGES OF THE INVENTION

An advantage of attribute locking is to manage making changes to Feature attributes after a customer has committed to a product or service, but before all of the work to provision the product or service has been completed. For example, it allows changes to the requested completion date, or the service number allocated (for example) before the cut-off point. By managing the locking of Features in the manner described, System Administrators can prevent problems of inconsistent data and incorrect billing. CSRs and other other users thus are provided information on the maintainability status of each feature before any changes can be implemented.

It is to be understood that the invention is not limited only to the embodiments described, but that numerous alterations and modifications, as would be apparent to one skilled in the art, are included within its scope.

We claim:

1. A method for executing a series of sequential tasks existing within a system-level domain of a customer service computing system providing provisioning of meta-level domain products, each said product having features, and said features carrying an attribute prescribing a related locking milestone, the method comprising the steps of:
   (a) designating one or more of said tasks as a milestone; and
   (b) executing said sequence of tasks, and for each said milestone task:
      determining, as a precondition, whether said feature has attributes associating it with a customer so as to be valid, then
      (i) making an enquiry of a related said product feature to determine whether the task milestone corresponds to said locking milestone and, if so,
         placing the said feature in a locked state such that its attributes cannot be changed until execution of said task sequence is complete, and then
      (ii) continuing with said execution,
   whereby milestone tasks are reflected as aspects of said product features in the meta-level domain, and there is the further step of defining milestone status in said meta-level domain.

2. A method for provisioning goods and services in a customer service computing system, comprising the steps of:
   (a) defining one or more sequential series of tasks in a system-level domain representing the provisioning required for any one of a plurality of product actions existing in a meta-level domain relating to said goods and services, each said product having features, and said features carrying an attribute prescribing a related locking milestone; and for each said sequence:
   (b) designating one or more of said tasks as a milestone; and
   (c) executing said sequence of tasks, and for each said milestone task,
      determining, as a precondition, whether said feature has attributes associating it with a customer so as to be valid, then
      (i) making an enquiry of said product feature to determine whether the task milestone corresponds to said locking milestone and, if so,
         placing the said feature in a locked state such that its attributes cannot be changed until execution of said task sequence is complete, and then
      then
      (ii) continuing with said execution,
   whereby milestone tasks are reflected as aspects of said features in the meta-level domain, and there is the further step of defining milestone status in said meta-level domain.

3. A computing system for the provisioning of goods and services, comprising:
   processor means operable to define one or more sequential tasks in a system-level domain representing the provisioning required for any one of a plurality of product actions existing in a meta-level domain relating to said goods and services, each said product having features, and said features carrying an attribute prescribing a related locking milestone, and, for each sequence, to designate one or more of said tasks as a milestone, and execute said sequence of tasks such that for each said milestone task an enquiry is made of a said product feature to determine whether the task milestone corresponds to said locking milestone, wherein said processor means is further operable, if said enquiry is true, to place the said feature in a locked state such that its attributes cannot be changed until execution of said task sequence is complete, wherein said processor means is further operable to determining, as a precondition, whether said feature has attributes associating it with a customer so as to be valid, and wherein milestone tasks are reflected as aspects of said features in the meta-level domain, and said processor means is further operable to define milestone status in said meta-level domain.

* * * * *